United States Patent

[11] 3,542,457

[72] Inventors George H. Balding
 Los Altos;
 Jonathan J. Stinehelfer, Sunnyvale; David H. Ziegler, Palo Alto, California
[21] Appl. No. 750,588
[22] Filed Aug. 6, 1968
[45] Patented Nov. 24, 1970
[73] Assignee Kaiser Aerospace & Electronics Corporation
 Oakland, California
 a corporation of Nevada

[54] ELECTRONIC EYE MOTION RECORDER SYSTEM
 14 Claims, 5 Drawing Figs.
[52] U.S. Cl. .................................................... 351/7,
 351/9, 351/16; 350/296, 350/298, 178/6 Ind
[51] Int. Cl. .......................................................... A61b 3/14
[50] Field of Search ........................................... 351/1, 6, 7,
 9, 13, 16, 39; 350/145, 174, 296, 298;
 356/21; 178/6Ind, 6.6A

[56] References Cited
UNITED STATES PATENTS
| | | | |
|---|---|---|---|
| 2,633,051 | 3/1953 | Davis | 356/251 |
| 3,236,578 | 2/1966 | Mackworth et al. | 351/7 |
| 3,278,680 | 10/1966 | Hummel | 178/6.6(A)UX |

Primary Examiner—David Schonberg
Assistant Examiner—Paul A. Sacher
Attorney—Brown, Jackson, Boettcher, & Dienner ABSTRACT: A head-mounted television eye motion recorder of the corneal reflex type used to measure eye movements. The recorder comprises a head mounting carrying two television cameras mounted on opposite sides of the subject's head, one camera responding to the scene which is being viewed, and the other camera responding to a spot of light which is reflected from the cornea of one eye so as to be responsive to eye movement. This eye spot is superimposed on the scene being viewed, and is electronically mixed therewith. The eye movements can be observed in real-time direct viewing on a video monitor, and also from data recorded on video tape.

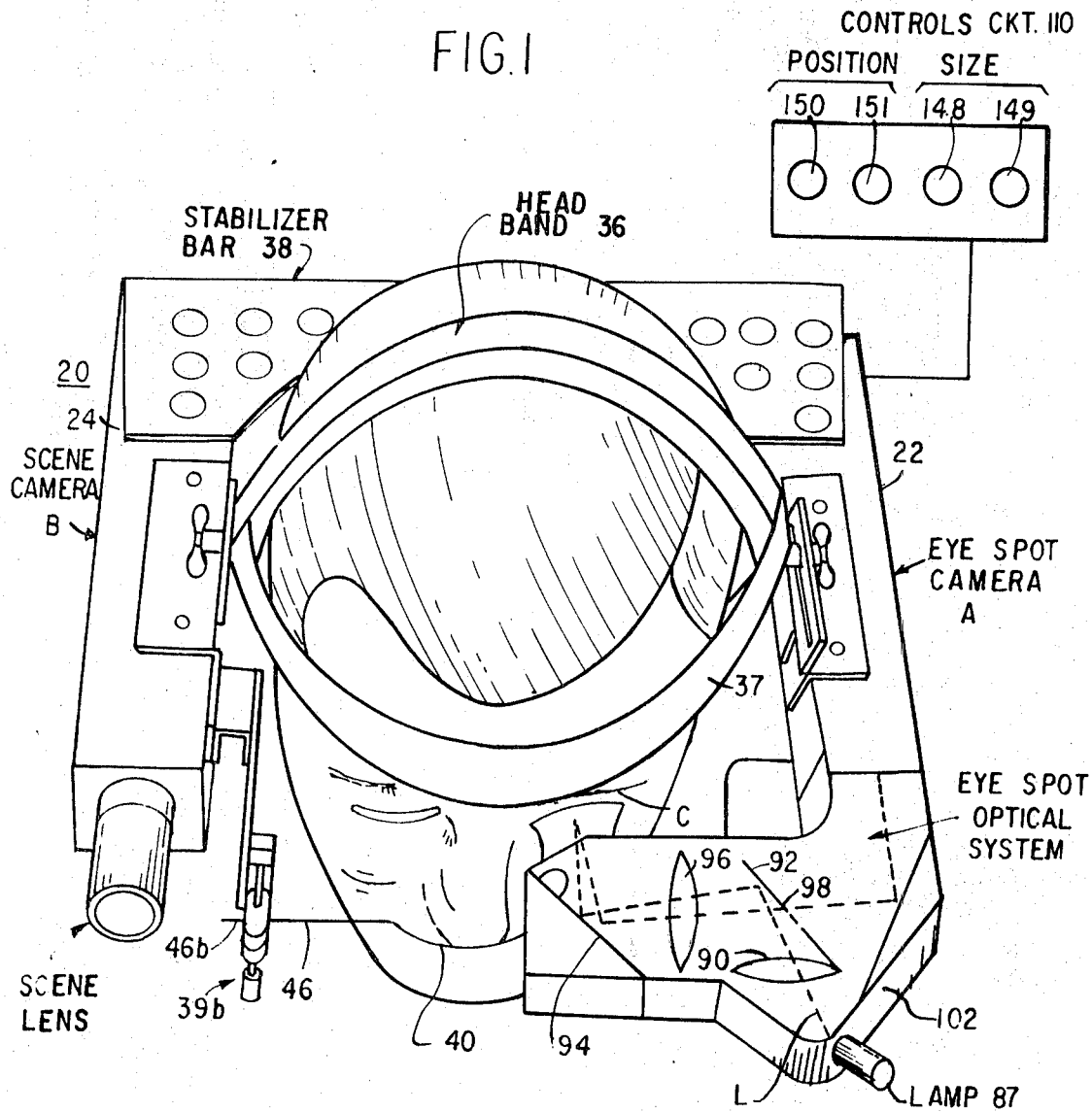

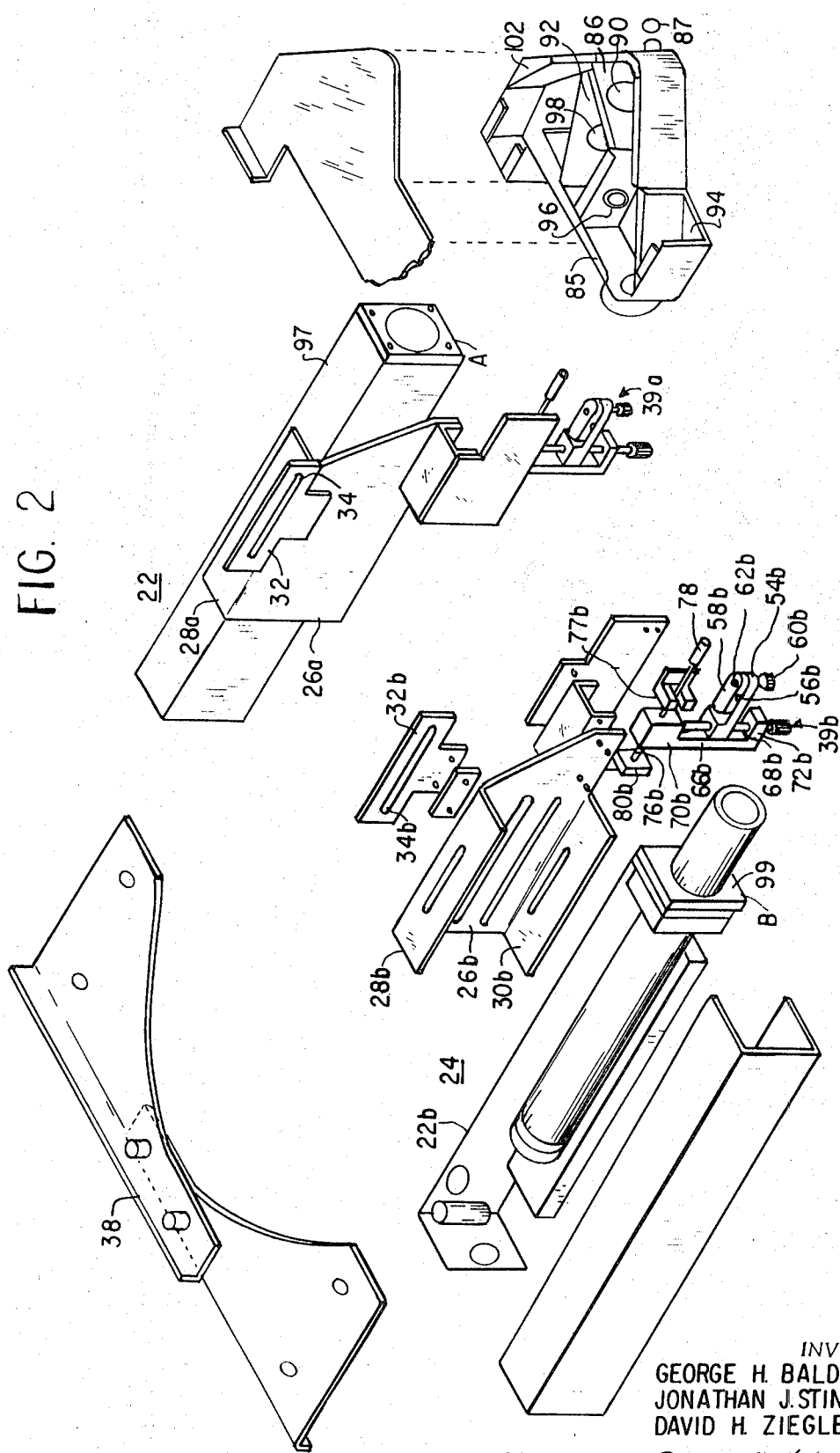

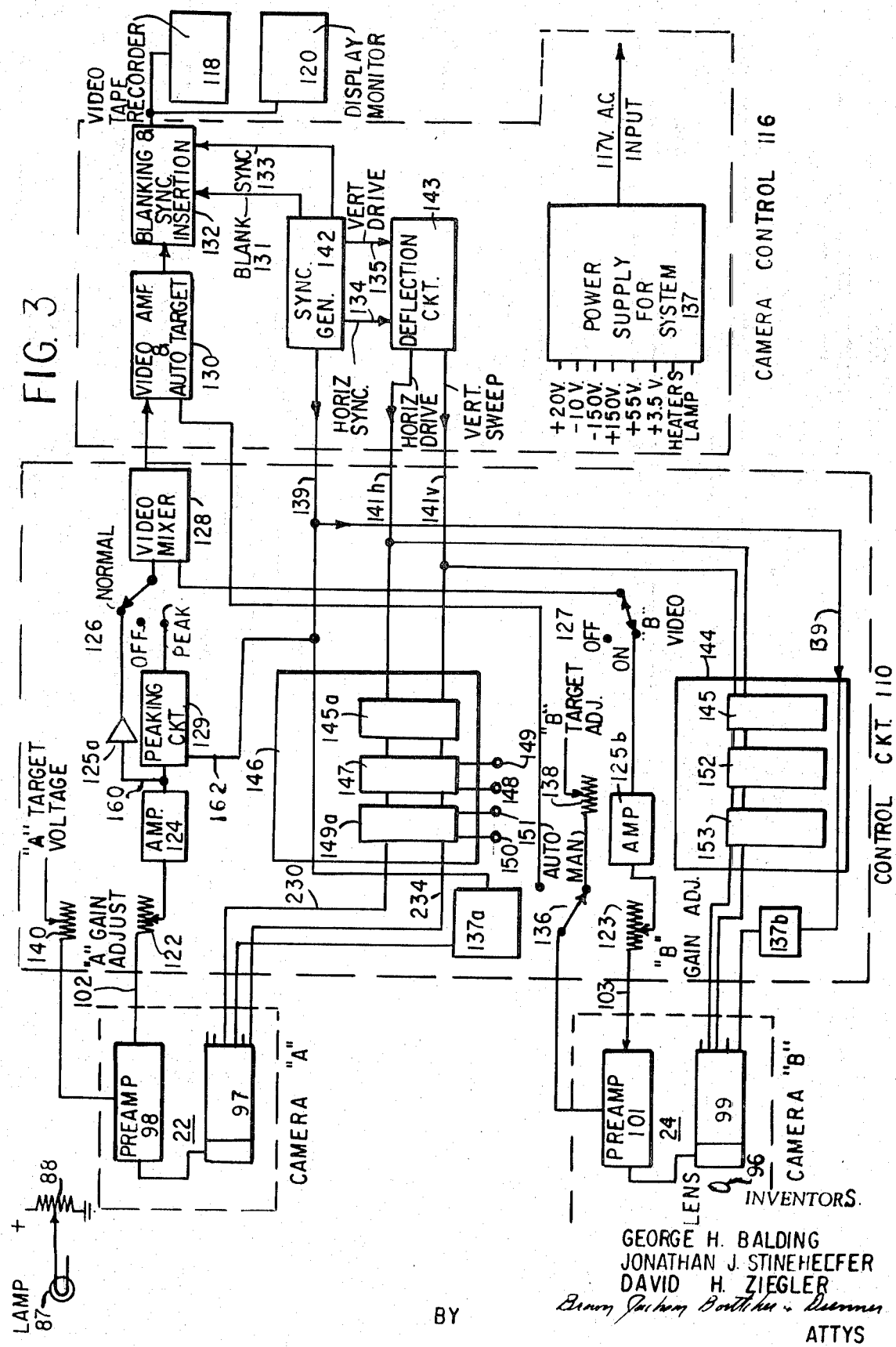

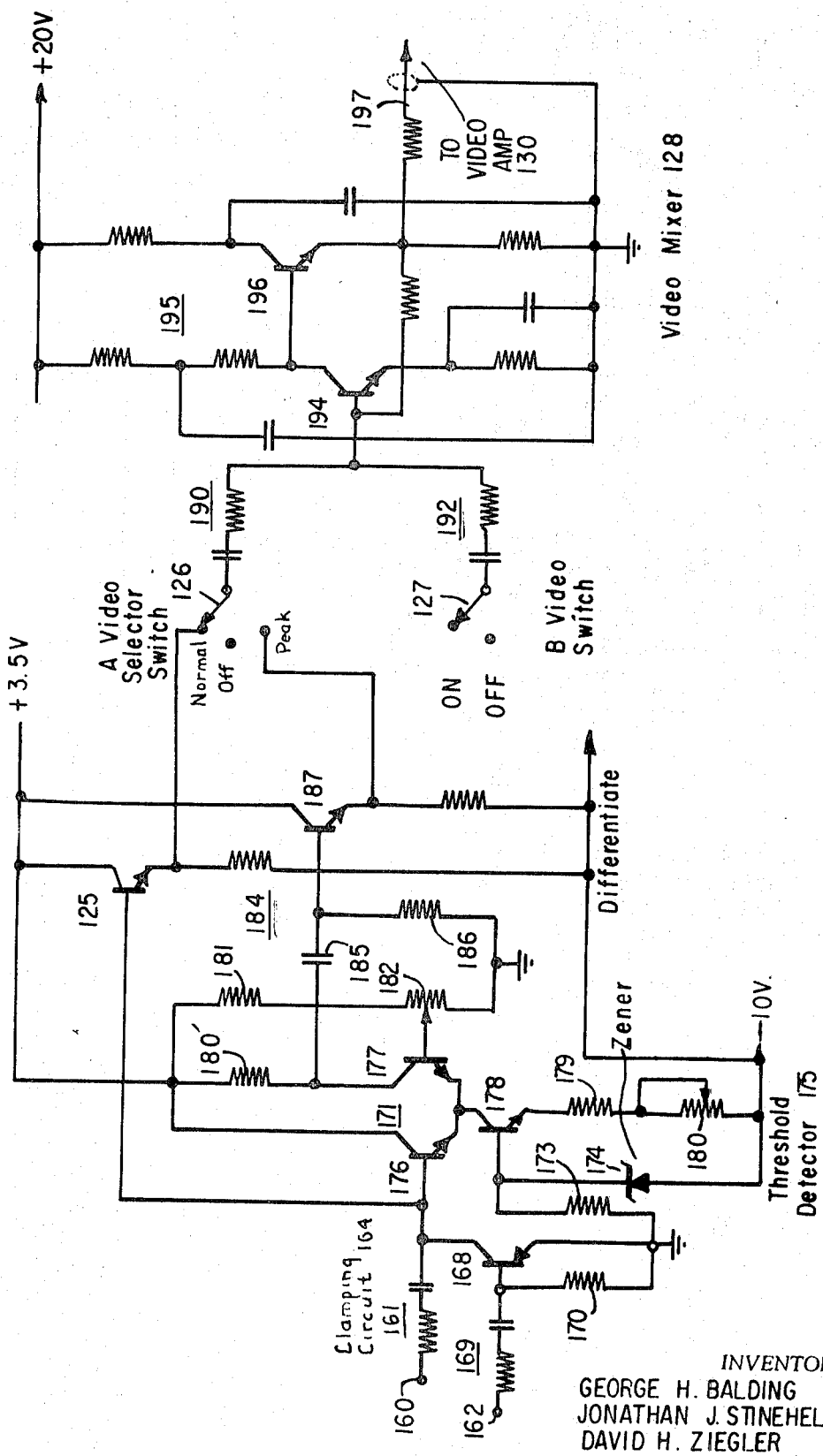

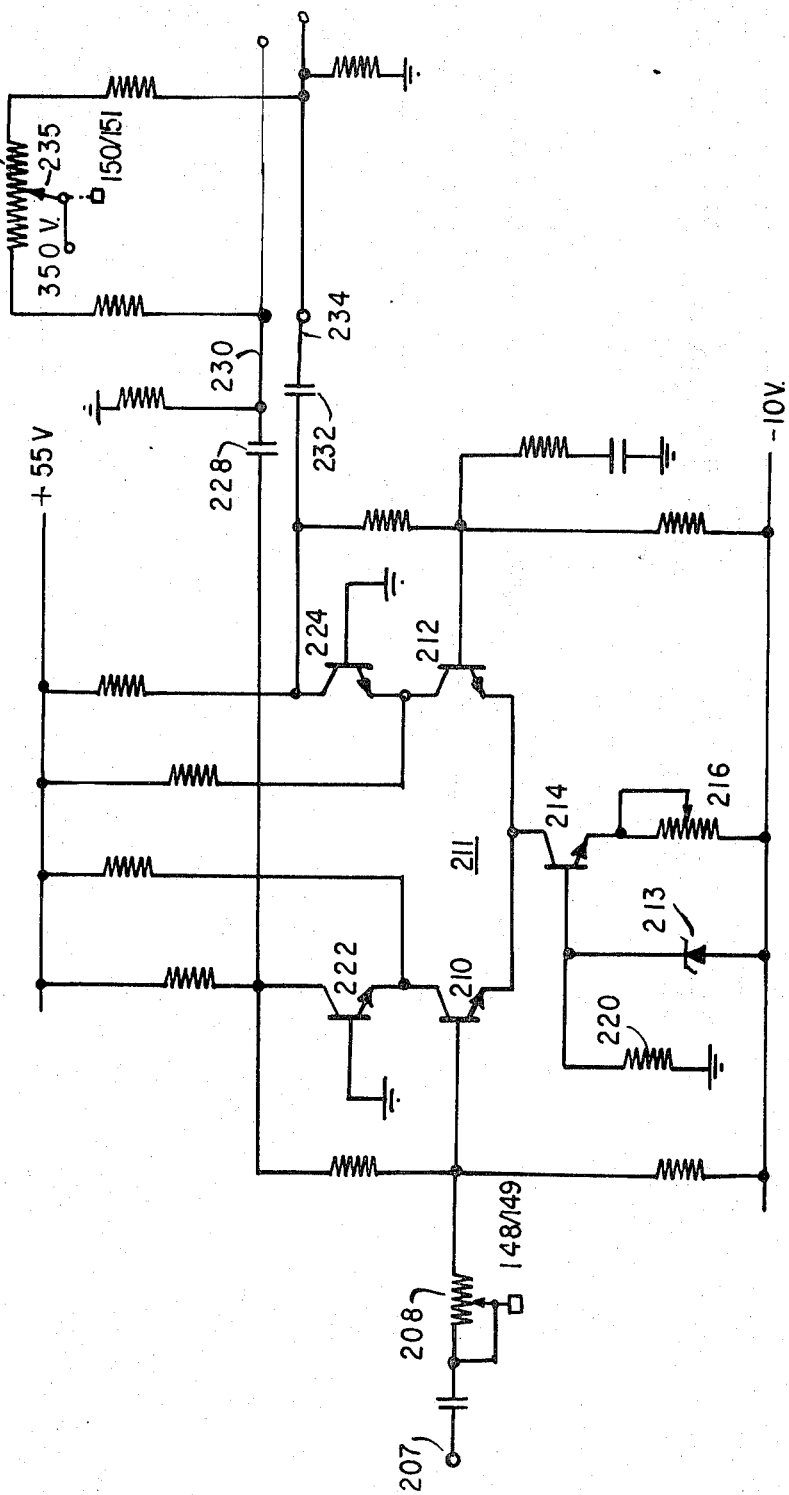

3,542,457

ELECTRONIC EYE MOTION RECORDER SYSTEM

BACKGROUND OF THE INVENTION

1. Field of the Invention

The present invention is directed to a system for effecting eye motion measurements, and in particular a record of central fixation points of a subject under observation.

2. Description of Prior Art

Previous eye movement investigations have shown that the visual mechanism of the human eye is complex and, at best, poorly understood. The eyes are continually in motion, even when an attempt is made to maintain steady fixation. In addition, the involuntary eye motions are characteristically very small in magnitude, typically less than one-third degree of arc.

In movements greater than approximately one-third degree of arc, the eye resembles a pulse type servomechanism. The leading edge of rapid eye movement can have a frequency component as high as 20 Hz. However, from strictly neurophysiological considerations, a delay of at least 150 milliseconds can be expected between the receipt of a stimulus on the retina and a corresponding muscular response. Actual measurement shows the maximum frequency response of the eye motion mechanism in voluntary tracking movements in less than 3 Hz. These and other factors introduce serious problems which make difficult the provision of a reliable measurement and recording of eye motion.

Prior to this time, there have been four basic methods which have been used in an attempt to provide eye movement measurements. However, the problem of measuring very small angles or distances with a high degree of precision under these unfavorable conditions has not been satisfactorily solved by any of these methods.

Briefly, in the one method identified in the art as electromyography, needles are inserted into the occular muscles and with movement of the eye ball, electrical potentials from the occular muscles are recorded. With this technique the subject is placed supine in a screened room, a ground contact needle is inserted through the ear lobe, the eye lid is held open with a speculum and the contact needles are inserted into the occular muscles. Such technique is traumatic to the subject, requires immobilization of the subject, requires a high gain amplifier, is unreliable and presents data in a form which is difficult to interpret.

In yet another approach known as electro-oculography, the difference of potential which appears between a pair of electrodes placed adjacent to the eyes is recorded. Such technique relies on the fact that the cornea is approximately 5 mv positive with respect to the retina, and the eyeball may be likened to an electric dipole embedded in an electrolyte. By pasting electrodes to the skin above, below, and to either side of the eye, difference signals can be obtained to give X and Y coordinates of eye position. Such technique is reasonably accurate in determining horizontal movement but is limited in vertical accuracy apparently due to eye lid movement. In addition, such method is poor for positional determination due to base line drift caused by changes in the "electrolyte" and in the "dipole". Galvanic skin resistance varies with emotional state and corneal potential varies with light intensity. Further, the output is in a form which is difficult to correlate with the picture which is presented.

Contact lens techniques have also been employed, and likewise were found to have practical drawbacks. The lenses used are of the large scleral type which are unfortunately quite uncomfortable. The lenses must be carefully fitted to the wearer and must be carefully inserted to exclude air bubbles or there will be unacceptable relative motion between the eye and the lens. Various contact lens techniques which have been developed for such purpose rely upon placing something in the eye which can be tracked more easily than the eye itself. Contact lenses have been made with imbedded mirrors, mirrors on stems, light bulbs on stems and with coils wound in the lenses for inductive pickup. The contact lens techniques have been successful in determining basic mechanical characteristics of the eye motion mechanism, but because of the discomfort of the lenses and the necessity to immobilize the head, the results are of questionable value for many psychological investigations.

In yet a further technique known as corneal reflection, a spot of light is projected on the cornea of the subject. Such technique utilizes the assumption that the surface of the cornea is a section of a sphere and that as the eye moves the movement of a point on the cornea describes another approximately spherical surface, but these two spheres are of different radii. As a result, a spot of light projected on the cornea appears to move as the eye moves. One form of eye motion camera is worn upon the experimental subject's head and records the scene presented to the subject with the eye reflection light spot being optically added to the scene recording. The result, then, is a moving picture of the scene being viewed with the light spot superimposed on the point of gaze.

While this approach appears to be most desirable, since there is little restraint or interference with the natural movement of the subject, it has been found that serious mechanical drawbacks exist in such arrangement which limit the performance of the unit. That is, it is apparent that in providing a system which relies upon the reflection of light from a moving sphere and the positioning of the spot of reflected light relative to a scene to be recorded, it is essential in the first instance that the spot be precisely alined with the point of fixation of the subject. In addition, it is equally important that as the eye moves from right to left (or up and down) that the reflected light remain within the scene or area being filmed. Further, such relationship, once established, must be maintained during the test, and if perchance movement occurs to disturb the relationship, some reasonably simple method must be provided to reestablish the relationship. Without such ability, the tests will provide unreliable results, and existing systems which had such shortcomings were considered unsatisfactory for such reasons.

Briefly, in any system it is very difficult to aline the camera with the skull. It is even further difficult to maintain alinement between the camera and the skull. In known systems, the mechanical attempts to locate the white spot of light connected with the point on the scene which was being filmed led to even further difficulties, and attempts to adjust the spot to remain within the scene area being recorded on the camera were frustrating and, in many instances, practically impossible. In cases in which the desired relationship of spot and scene were achieved prior to a test, it was not unusual for the equipment to experience movement during the test as the result of movement of the subject and the relative positions of the spot and the scene would be correspondingly altered. Attempts to reestablish the same relationship after such movement were most difficult.

In addition, since the camera had to be of a reasonably small size since it was to be carried on the head, only limited film footage was available before the tests would have to be interrupted for the purpose of replenishing the film supply, and the positioning process would have to be again endured. Of greater concern is the fact that such relative change in position of the spot and the scene can occur without knowledge of the user since there is no readout of the information provided by the film camera during the test.

It was also observed that, due to the nature of optical addition or mixing, extreme losses of the reflected light occurred prior to recording in the camera. In addition, the large spot which results from known recorders (recorded eye spot frequently occupying as much as 50 percent of the area of the recorded image), provided poor resolution and poor results. Other shortcomings included inefficient use of the film area compared to that which is available, no practical method of calibration, and occluded vision of one eye which tends to distract the subject and contributes to his fatigue.

SUMMARY OF INVENTION

This invention relates to an eye motion recorder system for use in the field of human factor studies which fundamentally utilizes two television cameras, the outputs of which are electronically added or mixed to provide a scene for display or measurement purposes, along with an eye spot superposed on the scene which indicates the point of fixation of the user, or where the user is looking. The assembly comprises a scene camera consisting of an electrostatically deflected vidicon television camera located on one side of the subject's head, and an eye spot camera of similar construction located on the opposite side of the subject's head. A headband support for the assembly comprises an upper band which extends across the top of the subject's head and a band which extends around the forehead and the back of the head, both bands being secured to the camera mounts and being adjustable to effect a comfortable fit on the subject's head. A stabilizer bar extends across the back of the subject's head and is fixed to the rearward portions of the cameras.

The assembly is held in rigid fixed position in one embodiment by means of a dental attachment which comprises an upper dental plate which is molded to the teeth and upper jaw of the subject. Such dental attachment has a stabilizing bar projecting from opposite sides of the mount for engagement with cooperating mechanical adjusting supports on the assembly. These adjusting supports are unique in affording lateral spreading support, vertically adjustable support, and fore and aft horizontal support of the two cameras relative to the dental mounted stabilizing bar and permits initial gross adjustments of the eye spot relative to the scene to be viewed. The attachment to the upper jaw insures rigidity of attachment to the skull and thus to the eyeball mounting. Other types of attachment which insure rigid attachment to the skull can also be used.

A wraparound optical system is mounted forwardly of the eye spot camera whereby the subject may view a field in the order of 40° through a window in the assembly, which field is recorded by the scene camera. The optical assembly includes a dichroic mirror located along the axis of sight of the subject's eye. The optical assembly further includes a fixed light and a lens system comprising a condensing lens and a focusing lens which direct a beam of light at the dichroic mirror which in turn directs the beam to the cornea of the subject. The cornea has the characteristics of a spherical mirror and reflects the light beam at an angle determined by the fixation point of the subject at the time. The reflected beam is directed by the dichroic mirror through a hole in the center mirror to a third mirror which in turn directs the beam to the faceplate of the eye spot camera. The outputs of the two television cameras (which comprise respectively a scene and a spot indicating the point in the scene viewed by the subject) are electronically added or mixed and provided as inputs to a TV monitor for instantaneous viewing and/or video tape recording for delayed viewing. A film camera may also be used to make a permanent record of the display.

The novel system further includes novel electronic adjustment means which permits the desired precise adjustments of th eye spot relative to the point of fixation of the subject on the scene to be recorded. This electronic adjustment constitutes an important feature of the invention. That is, in units known heretofore, it has been necessary to effect initial registration of the eye spot with the fixation point of the subject through mechanical adjustment means alone. Since the subjects seldom, if ever, have the same physical characteristics it is difficult to effect, through mechanical means alone, the desired registration or coincidence of the eye spot with the point being viewed on the scene by the subject.

In the present arrangement the assembly is firmly mounted on the subject, and the subject is merely required to look at the center of the screen, at which time the eye spot is adjusted horizontally and vertically to the center, first the mechanical adjusting mechanism and then by the electronic control, the latter adjustment being effected by simply moving a first and a second knob on the electronic controls. Other points, usually near the edges of the scene, are then selected, and a second set of knobs are adjusted to insure registration of the eye spot with the secondary points of fixation of the subject so that the user is assured that any movement of the eye will be within the parameters of the scene being viewed. The novel electronic controls further permit adjustment of the relative distance of movement of the eye spot on the scenes for a given degree of movement of the eye. In addition to permitting rigid reliability and accurate coincidence in the initial setup, the electronic positioning controls afford a further advance in the art in that frequent rechecks of the registration may be made with simplicity, and as a result more reliable data are obtained.

The provision of a system using television cameras is further novel in that instantaneous readout is continually available, while still permitting a recording of permanent data on associated recording means. Thus, continuous monitoring of the results being achieved makes possible the immediate detection of any change in the relationship between the spot and the scene and the immediate correction thereof.

Use of television cameras also effects a reduction in the weight of the entire assembly whereby the subject may comfortably wear the device for longer periods of time. The duration of the time of use of the unit is further extended over the prior art devices which use cine cameras in that there is no need to interrupt a run for the purpose of replacing film. Additionally, more comprehensive data is obtained with the new unit in that the subject has vision from both eyes, can talk normally during the tests and is, overall, more comfortable than in previous systems, whereby the possibility of system movement of the subject's head is correspondingly reduced.

A novel spot shaper used in the electronic system further enables the provision of a more consistent output to the data processing equipment in its use with subjects having different eyeball physical characteristics.

Other features, objects and advantages of the invention will be apparent from the following detailed description of one preferred embodiment thereof.

BRIEF DESCRIPTION OF THE DRAWINGS

FIG. 1 is a plan view of the assembly in mounted position on the head of the user;

FIG. 2 is a perspective view of the head-mounted portion of the eye motion recording system;

FIG. 3 is a diagram of the electronic circuits;

FIG. 4 is a detailed disclosure of the peaking circuit and mixing circuit shown in FIG. 3; and FIG. 5 is a detailed showing of the sweep or deflection amplifiers and associated positioning controls for the system.

DESCRIPTION OF PREFERRED EMBODIMENTS

Referring first to FIG. 1, the eyespot camera, designated A, is shown as being mounted on left-hand side of the subject's head, and the scene camera, designated B, is shown as being mounted on the right-hand side, although this is purely an arbitrary arrangement which may be reversed if desired. The two cameras are supported on a head mount or harness designated 20 in its entirety, which mount comprises a mounting box or channel 22 for the eyespot camera A, and another mounting box 24 for the scene camera B, both cameras being mounted substantially in the horizontal plane of the subject's eyes and pointing forwardly in substantially parallel relation. As shown in FIG. 2, the mounting structures for each of the cameras A, B, are identical, and like parts are therefore identified by like numbers, and distinguished one from the other by the letters $a$, $b$. With reference to camera B which is shown in exploded perspective, the mounting box comprises a substantially vertical bracket 26$b$ having outwardly projecting upper and lower flanges 28$b$ and 30$b$, between which the camera and its mounting box are mounted. The vertical sidewall 26$b$ carries a vertical flange extension 32$b$ provided with horizontal slots 34b through which pass the ends of an upper head band 36 (FIG. 1) extending across the top of the subject's head, this head band being adjustable in length to raise or lower the two cameras. A front head band 37, which is affixed to upper head band 36, may also extend around the forehead and back of the head of the subject. The rear ends of the two camera boxes are joined together by an adjustable stabilizing bar 38, this stabilizing bar comprising two adjustable sections which can be adjusted to accommodate different spacings of the two camera boxes. Carried by the forward portions of the two camera boxes are adjusting mechanisms 39a and 39b (FIG. 2) for effecting vertical and horizontal adjustments between each camera box and a dental attachment 40, which adjusting mechanisms will be described following the description of the dental attachment 40.

The dental attachment may be in the form of an upper dental plate adapted to fit over the upper teeth in the subject's mouth, which is made of metal to conform to the configuration and location of the subject's teeth. As inserted in the mouth, the conforming portions of the plate fit over and clasp firmly to the teeth of the subject and a further portion of the plate conforms to the upper roof of the jaw. Other forms of bite bars which provide fixed positioning to the upper jaw of the subject may also be employed. This upper denture plate 40 is provided with a stabilizing bar 46 (FIG. 1) having the left and right extending ends 46a, 46b. The stabilizing bar 46 through means of the dental plate has rigid anchorage to the upper jaw of the subject; i.e., it has a rigid attachment to the skull and eye sockets of the subject's head. That is, this rigid anchorage is not released by the subject moving his jaw downwardly, in the act of talking, or otherwise opening the mouth and for this reason may be preferred.

Referring now to the mode of attachment of the left and right ends 46a, 46b of the stabilizing bar 46 to the left and right adjusting mechanisms 39a, 39b of the left and right camera mounting boxes 22a, 22b, these two adjusting mechanisms 39a, 39b are substantially identical. Again with reference to the mounts for camera B, the adjustment mechanism comprises a vertically movable clamp base 54b having a transverse clamping groove 56b in its top surface, into which the adjacent end of the stabilizing bar 46 extends. The stabilizing bar is adapted to be clamped in different positions in groove 56b by an upper clamping member 58b which is adapted to be drawn downwardly into clamping engagement over the bar by the action of a clamping screw 60b which passes freely through a hole in the clamping base 54b and screws into a threaded hole 62b in the upper clamping member 58b. The upper clamping member 58b can be swiveled around the axis of the screw 60b for opening the top of the clamping groove 56b to facilitate insertion of the stabilizing bar therein, and can then be tightened down to engage different desired points along the stabilizing bar and establishing different lateral spacings of the two cameras outwardly from the dental attachment 40.

The rear end of clamping member 54b has vertical sliding adjustment along the vertical front face of a forward and rearward adjustable guide bar 66b. A vertical adjusting screw 68b screws into a threaded hole in the clamp member 54b, and has rotatable mounting at its upper and lower ends in upper and lower bearing blocks 70b and 72b projecting forwardly from the bar 66b. Rotation of the adjusting screw 68b serves to raise or lower the camera mounting 24 relative to the clamping member 54b which is fixedly positioned to the end 46b, of the stabilizing bar. The bar 66b is adapted for forward and rearward adjusting movement along a horizontal adjusting screw 76b which screws through a threaded hole in the upper block portion 70b. The end portions of this screw 76b having bearing mounting in front and rear bearing brackets 78b and 80b carried by the camera mounting box 24.

It will be seen from the foregoing that the two adjusting mechanisms 39a and 39b provide for adjusting movement of the two cameras A AND B relative to the dental anchorage attachment 40 in several planes; i.e., in transverse planes to right or left by shifting the clamp members 54a, b along the ends 46a, b, of the stabilizing bar 40; further in vertical planes by operating the adjusting screws 68a, b; and still further in forward and rearward directions by the operation of the adjusting screws 76a, b. In addition to the gross positioning of the camera images effected by the above described mechanical adjustment mechanisms 39a and 39b the electronic adjusting means, to be later described, provide the desired relationships between the reflected spot and the recorded scene.

Reference will now be made to the optics of the eye spot optical system which projects an artificial light beam against the cornea of the subject's left eye, and receives back from this cornea an eye spot reflection beam which it projects into the eye spot camera A. This occurs primarily in optical box 85 (FIGS. 1 and 2) which is secured to the front end of the left hand mounting box or channel 22 which carries the eye spot camera A. This optical box has a diagonally extending front wall 86 which carries a lamp 87 constituting the artificial source of light powered by a suitable source. A light beam L projected rearwardly and inwardly therefrom passes through a condensing lens 90 and thence to an angled reflecting plate or mirror 92. From this mirror 92, the light beam is reflected inwardly through a focusing lens 96 to a semireflecting plate 94 oriented at a 45° angle to the normal line of vision of the subject. This semireflecting plate 94 directs the light beam against the cornea C of the subject, from whence an eye spot beam is reflected back to said semireflecting plate 94, and thence laterally outwardly through focusing lens 96 to an aperture 98 in the angled mirror 92. From this aperture, the eye spot beam strikes another mirror 102 which directs the beam rearwardly into the eye spot camera A.

The spot beam L projected onto the cornea C will preferably be of limited spectral content. The spectral content can be adjusted so that good camera A response can be obtained and the subject will suffer minimum discomfort and distraction. This limited spectral content beam is less objectionable to the subject than the glare of a bright white light. The beam of limited spectral content may be produced by any suitable emitter placed in the position of source bulb 87, or it may be created by a suitable filter interposed between the light source and the cornea. For example, in the current preferred embodiment, the semireflecting plate 94 is a dichroic mirror which reflects blue and shorter wavelengths and which is almost transparent to the longer visible wavelengths.

CIRCUITRY DESCRIPTION

With reference now to FIG. 3, the electronic circuitry of the novel system is schematically set forth thereat. The system, as shown, includes an eye motion camera A, a scene camera B, a control circuit 110, camera control 116, video tape recorder 118 and a monitor 120.

Each of the cameras A, B, is located in a box housing 22, 24, of magnesium and is stripped to a minimum of parts for purposes of weight reduction. With reference to scene camera B, for example, the housing locates a single lens 96 mounted as a pickup for a vidicon tube 99, which may be a full electrostatic deflection and focus tube, type 7522, manufactured by General Electrodynamics Corporation. The electrostatic focus and deflection (rather than the usual magnetic focus and deflection) in the two vidicon television cameras A and B results in units of lighter weight.

The camera housings 22, 24 also located preamplifier stages 98, 101 respectively comprised of solid state components connected in a preamplifier circuit to raise the 0.2 microampere, high impedance output of the camera tube to approximately one-half volt from a 75 ohm source impedance. The output signals are fed via conductors 102, 103 respectively to input terminals of control circuit 110.

The signal output of the eye spot camera A via conductor 102 is fed over a gain adjustment circuit 122 and amplifier stage 124 (which may be comprised of a transistor feedback gain pair and an emitter follower stage) and over amplifier 125a and a first position of selector switch 126 to a first input in video mixer stage 128.

Selector switch 126 in a third position permits selective connection of the output signals of eye spot camera A via a peaking circuit 129 to video mixer 128 for the purpose of enhancing the spot output from camera A in a manner to be described. The signals of the scene camera B output over conductor 103 are fed over a similar path in control circuit 110 including gain adjustment circuit 123, amplifier circuit 125b, and selector switch 127 to a second input on video mixer circuit 128.

Video mixer circuit 128, described in more detail hereinafter, basically comprises an operational amplifier summing circuit which has a low output impedance to drive a transmission line which terminates in video amplifier 130, the output of which is in turn fed via a blanking and sync insertion circuit 132 as a composite video output to monitor 120 for visual display, and/or to video tape recorder 118 for recording on associated tape media to provide a permanent record.

Video amplifier circuit 130 may also include an autotarget circuit which integrates the video signal and produces a d.c. control voltage to set the vidicon target bias voltage for the scene camera B when the switch 136 is in the automatic position. When switch 136 is in the manual position, the camera B target bias voltage is manually set by a potentiometer 138. Potentiometer 140 is used to set the target voltage for camera A.

The video cameras A and B are synchronized with the system by a sync generator circuit 142, which as shown, provides blanking and sync signals via conductors 131, 133 to insertion circuit 132 and over conductor 134, 135 to deflection circuit 143. Sync generator 142 also provides blanking signals over conductor 139 to control circuit 110 for the cameras A and B.

Deflection circuit 143 which is connected to receive horizontal sync pulses and vertical drive pulses from sync generator 142 provides horizontal drive pulses and vertical sweep pulses over conductors 141h, 141v to circuits 144 and 146 in control circuit 110.

Video amplifier circuit 130, blanking and sync insertion circuit 132, sync generator 142 and deflection circuit 143 may be of the type commercially available as a Camera Control, Model 3900, manufactured by Cohu Electronics Incorporated at San Diego, Calif. Such control also includes the power supplies 137 used for the cameras A, B, light source 87 and other components of the system.

Circuit 144 for scene camera B includes the horizontal sweep generator and vertical sweep amplifier 145b (not shown) which are connected to and operated by the horizontal drive and vertical sweep signal outputs from deflection circuit 143. The output of circuit 145b is fed to sweep amplifiers 152 of the feedback differential type (shown in FIG. 5 and described in more detail hereinafter) having size controls which are adjusted to correspondingly vary the horizontal and vertical sweep magnitude in camera B. In one embodiment the size controls were set to provide 70 volt plate to plate vertical sweep, and 90 volt plate to plate horizontal sweep to thereby produce a ⅝ inch × ½ inch raster for the target of the scene tube B.

The output of the sweep amplifier circuit 152 is fed to the position control and deflection plate bias networks 153 for the position control vidicon camera B. Internal adjustment of the position control circuit for scene camera B provides differential bias voltages to the deflection plates of the tube so that the raster can be displaced to any part of the target. Suitable bias circuits provide the bias voltages required for operation of the video tube. Blanking for the scene camera B is achieved by pulling the tube cathode to +20 volts during the blanking pulses which are provided over conductors 139 by sync generator 142.

The circuitry 146 for camera A is similar to circuitry 144 for camera B with the exception that controls are provided for use by the operator in effecting precise, accurate positioning of the eyespot detected by camera A relative to the scene which is provided by camera B, and also for the purpose of adjusting the extent of movement of the spot relative to the scene for a given movement of the eye of the subject. Briefly, circuitry 146 includes sweep generators 145a, sweep amplifiers 147 and position control and bias network 149a.

The first set of controls 148, 149 for sweep amplifiers 147 are extended externally to the user for the purpose of changing the overall size of the raster on eyespot camera A. Thus while the size of the raster of the scene camera B is preset (⅝ inch × ½ inch raster for 70volt, 90volt) the sweep size controls for the eyespot camera A are adjustable to different values (normally of a lower value than the 70volt, 90volt potentials used in the scene camera). Adjustment of the sweep voltages to a lower value adjusts the raster to a smaller size, whereby a given movement of the eye results in an increased displacement of the spot relative to the scene. As a result, a movement of the eye of the subject through a given distance for the smaller raster will result in a greater movement relative to the scene than the same movement with the larger raster. With such control it is possible to readily adjust the system for use with different subjects. That is, the eyes of different subjects will reflect in a different manner and the same movement by the eyes of the different subjects will not necessarily move the reflected spot through the same distance relative to the recorded scene. In some instances, such differences may result in the eye spot movement not corresponding in degree to the actual movement of the eye. Adjustment of the raster size in this manner will provide the necessary compensation.

Horizontal and vertical controls 150, 151 on circuit 149a are position controls available external of the set as controls which effect application of differential d.c. voltages to the deflection plates of the eye motion camera A so that the raster can be displaced to any part of the target. As will be shown, the ability to adjust the raster in this manner permits adjustment of the relative positions of the spot and the scene.

PEAKING CIRCUIT

The peaking circuit 129 which is provided to produce a brighter, sharper spot, as shown in FIG. 4, has a first input 160 which is connected via amplifier 124, gain adjustable circuit 122 and conductor 102 to the output of preamplifier 98 for eye motion camera A (FIG. 3) and a second input 162 connected to the blanking conductor 139 from sync generator 142. The video signal input over terminal 160 from the eye spot camera A is fed via RC circuit 161 (FIG. 4) to the collector of transistor 168 in clamping circuit 164, to threshold detector 175, and to emitter follower transistor 125a. Input 162 connects the blanking signals on blanking conductor 139 over RC circuit 169 to the base of transistor 168, which is also connected over resistor 170 to ground. Transistor 168 operates as a clamp to pull the signal received from the eyespot camera A over input 160 to ground during periods in which the blanking signals are received over input 162.

Video signal received over terminal 160 are also fed to a differential threshold detector 175 comprised of transistors 176, 177 which are connected as a differential amplifier 171 with a transistor 178 providing a source of constant current for transistors 176, 177 via resistors 179, 180. The base of the transistor 178 is connected via zener diode 174 to a −10 volt source and over resistor 173 to ground.

The threshold detector 175 produces an output only when the input video signal exceeds a certain preset positive (or white) level determined by the setting on resistor 182, whereby all signals beyond a certain level of white are accentuated, and a spot of increased brightness is provided.

The output of transistor 177 in threshold detector 175 is fed over a differentiating circuit 184 including capacitor 185, resistor 186 to transistor 187 which is connected as an emitter follower to provide the input for the video mixer 128 whenever the selector switch 126 (FIG. 4) is in the "peak" position.

If the switch 126 is in the normal position, the video signals from the eye motion camera A are fed over amplifier 125a (FIG. 3) and the "normal" output position of selector switch 126 to the video mixer 128.

The video mixer 128 receives video signals from the eye spot camera A via the "normal" terminal or the "peaked" terminal of switch 126 (FIG. 4), and video signals from the scene camera B via the "on" terminal of switch 127. The respective sets of video signals are fed via RC coupling circuits 190, 192 to the input of an operational amplifier summing circuit 195.

As shown, the operational amplifier 195 includes a first transistor 194 having its base connected via RC circuits 190, 192 to the terminals on selector switches 126, 127 over which the respective signal sets of cameras A and B are received. The collector of transistor 194 is connected to the base of a second transistor 196, which is connected as an emitter follower to provide a low impedance output over conductor 197 to video amplifier 130 for amplification and display on monitor 120 and/or recording on video tape recorder 118.

As will be shown, the video signals transmitted to monitor 120 and video tape recorder 118 result in the display of a scene which is picked up on the raster of camera B and a white spot in overlay relation to a point on the scene, the white spot consisting of a light reflected from the eye of the subject and detected by eyespot camera A, the position of the spot on the scene being determined by the point of fixation of the eye of the subject on the scene.

SIZE AND POSITION CONTROLS

As indicated above, an important feature of the invention is the ability to adjust the amount of movement of the eyespot on a given scene for a given displacement or movement of the eye of the subject and the ability to electronically adjust the position of the eyespot relative to the scene. Such controls include size controls 148, 149 in the sweep amplifier circuit 147 for camera A and position controls 150, 151 in the position control circuit 149a for camera A. With reference to FIG. 5, the sweep amplifier circuits are identical as to basic design for both the vertical and horizontal deflection plates for camera A (and also for camera B), and as shown in FIG. 5 are of the feedback differential type which include a pair of transistors 210, 212 connected as a differential pair with their emitters connected to a constant current source comprised of a transistor 214 and adjustable resistor 216. A zener diode 213 is connected from the base of transistor 214 to a −10 volt source, and resistor 220 is connected from the base of transistor 214 to ground, so that the transistors 210 and 212 are biased to operate within a range of −10 volts and ground. Assuming the illustrated circuit is the horizontal amplifier of sweep amplifier circuit 147, the input terminal 207 is connected to the output of the horizontal sweep generator (not shown) of circuit 145a which is connected to the horizontal drive output 141h of deflection circuit 143 (FIG. 3). The vertical amplifier input (not shown, but similar to input 207) is connected to the vertical sweep conductor 141v of the deflection circuit 143, via circuit 145a.

Grounded base transistors 222, 224 are connected in the collector circuits of transistors 210, 212 respectively. Feedback loops from the collectors of transistors 222, 224 to the input bases of transistors 210, 212 provide bias, and improve gain stability and linearity. The output signals derived over the grounded base transistors 222, 224 are fed via capacitors 228, 232 to the deflection plate bias and position networks and to output conductors 230, 234 respectively to the horizontal deflection plates for camera A.

Adjustable resistors 208 in the horizontal and vertical amplifiers 147 are extended via control knobs 148, 149 externally of the housing for the control circuit 110 for by the operator in adjusting the size of the raster on the eyespot camera A, and thereby the extent of motion of the spot in relation to a given movement of the eye.

Briefly, as the horizontal sweep voltage waveform is received over input terminal 207, the differential amplifier 211 provides opposing polarity, magnified sawtooth waveforms over conductors 230, 234 to the deflection plates of the eyespot camera to drive the beam in the trace of a horizontal line having a vertical coordinate which is determined by the time coincident amplitude of the sawtooth waveform outputs over similar conductors in the vertical sweep amplifier. Movement of control knob 148 to adjust resistor 208 in the horizontal deflection amplifier of the sweep amplifier 147 to change the amplitude of the horizontal sawtooth outputs adjusts the length of the horizontal line trace on the target of eyespot camera A in a corresponding manner to thereby vary the width of the raster trace.

In like manner adjustment of the control knob 149 (on the vertical sweep amplifier) adjust the magnitude of the vertical sawtooth outputs and the vertical size or height of the raster trace.

As noted earlier, adjustment of the raster size in this manner results in a corresponding change in the extent of movement of the spot across the scene for a given degree of movement of the eye. As a result, the operator is provided with an extremely precise adjustment which makes possible use of the system with subjects having vastly different eye movement characteristics. Such adjustment along with the ability to position the spot at different locations on the displayed scene are essential features of this invention.

Positioning of the spot horizontally and vertically is effected by controls 150, 151 of position control circuit 149a (FIG. 3). As shown in FIG. 5 (assuming the illustrated deflection amplifier is the horizontal amplifier of the sweep amplifiers 147), movement of control 150 effects a corresponding adjustment of the position of arm 235 on potentiometer 236 which changes the balance of resistor bridge circuit 237 and a corresponding differential variations of the bias potential applied to the horizontal deflection plates to thereby correspondingly vary the horizontal coordinate of the beam on the target of camera A. In a similar manner, adjustment of control 151 will effect adjustment of a corresponding potentiometer in position control circuit 149a for the vertical sweep amplifier, and a corresponding change of the vertical position of the beam. It is apparent that position controls 150, 151 can be used therefore to vary the relative positions of the spot and the raster on the target of camera A and since the video content of the rasters of the two cameras is effectively overlaid in the video mixing process the resultant position of the spot on the recorded scene is varied.

OPERATION

In use of the system, the power supplies 137 are energized by connection of the power supply to a 117 volt source, and a separate switch (not shown) is operated to turn on scene camera B. Sync generator 142 and deflection circuits 143 provide horizontal drive and vertical sweep signals to sweep generator 145b to provide sawtooth waveforms via sweep amplifier 152 and position control 153 to the deflection plates of scene camera B. Blanking signals are provided by sync generator 142 over conductor 139 and blanking circuit 137b to the scene camera B.

Scene camera B as energized provides video signals in the manner of the conventional vidicon tube over circuit 101, conductor 103, gain adjustment 123, amplifier 125b, switch 127, video mixer 128, video amplifier 130, blanking and sync insertion circuit 132 to the monitor 120 (which may comprise a conventional cathode ray tube monitor set) which displays the scene being viewed by the scene camera B. The camera is then mounted on the subject's head as shown in FIG. 1.

The eyespot camera A and the power supply for lamp 87 are next energized and selector switch 126 is turned to the "normal" position. The lamp is adjusted to maximum intensity by suitable adjustment means 88. With camera A enabled by a separate switch (not shown) horizontal drive and sweep pulses to sweep generator 145a result in sawtooth waveforms via sweep amplifier 147 and position control 149a and conductors 230, 234 to the deflection plates of eyespot camera A. Blanking signals are provided by sync generator 142 over conductor 139 and blanking circuit 137a to camera A. With selector switch 126 in its normal position, video signals are provided over preamplifier circuit 98, conductor 102, gain adjustment 122, amplifiers 124, 125a, switch 126, to video mixer 128 for mixing with the scene video signal for processing to the display monitor 120 over the path described. If the lamp 87 and camera A are properly adjusted, a spot of light reflected from the eye of the subject over the path described above in the optic system is picked up on the raster of eyespot camera A and fed over the described electronic path to video mixer 128 for display with the scene on monitor 120.

At this time the subject inserts the dental attachment and the cameras are fixedly attached to either end 46a, 46b of the stabilizer bar 46 by inserting the ends thereof into the clamps established by groove 56 and clamping member 58. After the approximate position of the device is achieved, adjusting clamping screws 60a and 60b are tightened to fixedly position the cameras relative to the skull of the subject. Adjusting screws 68a, b are then moved to provide approximate centering of the spot along the vertical, and spot focus is mechanically effected by adjusting positioning knobs 76a, 76b to move the spot camera horizontally forward and rearwardly.

The selector switch 126 is now moved to the peak position to remove background noise and increase the spot brightness. The subject now fixates a point in the center of his view and the position controls 150, 151 are adjusted to precisely place the spot on the subject fixation point as viewed on the monitor. The subject now fixates several readily identifiable points in the scene to determine that the spot does move to these readily identifiable points of the scene area as viewed on the monitor. If the spot moves a lesser or greater distance than the eye fixation point displacement, the size controls 148, 149 are adjusted to change the raster size of camera A and thereby adjust the distance of movement of the spot to equal the distance the subject fixation point moves across the scene. Since the eyes of different subjects vary in radii the spot will move over different distances for different subjects, and the process of such method of control has made possible for the first time a correlation of eye position for different subjects.

We claim:

1. In an eye motion recording system, the combination of head mounting means for mounting on the head of the subject, a scene camera carried by said mounting means including means for enabling said scene camera to provide a video signal output of a selected scene which scene is also in the vision of the subject, an eye position detector means for providing information indicating the position of an eye of the subject, means including circuit means for converting said information to a video signal output representing the position of the eye, and means including video signal mixing means responsive to the signal output of the scene camera and to the signal output of the converter means to provide a display of the selected scene having a spot superposed on said scene at the point of fixation of the subject's eye.

2. In an eye motion recording system, the combination of head mounting for mounting on the head of the subject, a scene camera carried by said mounting means including means for enabling said scene camera to provide a video signal output of a selected scene which scene is also in the vision of the subject, an eyespot camera carried by said mounting means, means for projecting a beam of light to the cornea of one eye of the subject and transmitting a reflected spot of light to said eyespot camera, circuit means for enabling said eyespot camera to provide a video signal output of the spot position relative to its viewing area, and means including video signal mixing means responsive to the signal output of the two cameras to provide a display of the selected scene having a spot superposed on said scene at the point of fixation of the subject's eye, and means for adjusting said circuit means for said eyespot camera to independently adjust the relative position of the spot horizontally and vertically on said scene.

3. The eye motion recording system as recited in claim 2 wherein the scene responsive camera is a television camera carried by said mounting means on one side of the subject's head, the light spot responsive camera is also a television camera carried by said mounting means on the other side of the subject's head, and wherein the last means electronically mixes the outputs of the two cameras together to establish the visual fixation point of the subject's eye on the selected scene.

4. The combination recited in claim 2 in which said means for providing a reflected spot of light to said eyespot camera includes a source of light carried by said mounting means, and optical means carried by said mounting means for projecting a beam of light from said source to the cornea of one eye of the subject, and reflection from the eye back into said eyespot responsive camera.

5. The combination recited in claim 4 which comprises means for causing the beam of light which strikes the cornea to be of limited spectral content.

6. The combination recited in claim 2 which includes a stabilizer bar providing rigid positioning of the device relative to the skull of the subject, and in which mechanical adjusting means is provided between said stabilizing bar and said cameras comprising vertical adjusting means for adjusting the cameras vertically relatively to said stabilizing bar, and also comprising horizontal adjusting means for adjusting the cameras horizontally relative to said stabilizing bar.

7. A system as set forth in claim 2 in which the last means includes a video display monitor for providing a continuous instantaneous presentation of the spot and the scene display.

8. A system as set forth in claim 2 in which the last means includes a magnetic tape recording device for recording the combined video signal sets to provide a memory record thereof.

9. A system as set forth in claim 2 in which one of said cameras includes control means removed from the head mounted portion of the system for use in adjusting the extent of movement of said eyespot on said displayed scene for a given movement of the eye of the subject.

10. A system as set forth in claim 2 in which said circuit means for enabling said eyespot camera includes means for producing a raster on said eyespot camera, size control means for adjusting the horizontal and vertical size of said raster, and means extending said controls for adjustment by the viewer of the display.

11. A system as set forth in claim 2 in which said means for enabling said eyespot camera includes horizontal and vertical sweep amplifier means for producing a raster on said eyespot camera, and size control means for varying the signal output of said horizontal and vertical sweep amplifiers to thereby vary the horizontal and vertical size of said raster.

12. A system as set forth in claim 2 which also includes mechanical means for adjusting the position of the spot and its movement relative to said scene.

13. A system as set forth in claim 2 in which said means for enabling said eyespot camera includes peaking means for providing a sharper spot on said scene, and means for selectively enabling said peaking means.

14. In an eye motion recording system, the combination of head mounting means for mounting on the head of the subject, a scene camera carried by said mounting means including means for enabling said scene camera to provide a video signal output of a selected scene which scene is also in the vision of the subject, an eyespot camera carried by said mounting means, means for projecting a beam of light to the cornea of one eye of the subject and transmitting a reflected spot of light to said eyespot camera, video mixer means having a first and a second input, first circuit means connecting the output of said eyespot camera to said first input, second circuit means for connecting the output of said scene camera to the second input of said video mixer, horizontal and vertical sweep signal generator means for said cameras including sync generator means for synchronizing said cameras, size control means for said eyespot camera adjustable to different positions to vary the horizontal and vertical sweep signals provided to said eyespot camera to thereby vary the size of the raster generated thereon, and adjustable positioning means for providing different potentials for said eyespot camera to effect independent adjustment horizontally and vertically of the eyespot relative to the scene provided by the scene camera.